United States Patent
Ravenscroft et al.

(10) Patent No.: US 12,405,492 B2
(45) Date of Patent: *Sep. 2, 2025

(54) CONNECTING DISPLAY SCREEN TO DEVICE BODY

(71) Applicant: Microsoft Technology Licensing, LLC, Redmond, WA (US)

(72) Inventors: Colin Michael Ravenscroft, Woodinville, WA (US); Jason Dale Brown, Sammamish, WA (US); Shannon Elizabeth Miller, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/765,807

(22) Filed: Jul. 8, 2024

(65) Prior Publication Data

US 2024/0361630 A1 Oct. 31, 2024

Related U.S. Application Data

(63) Continuation of application No. 17/754,378, filed as application No. PCT/US2020/056438 on Oct. 20, 2020, now Pat. No. 12,050,375.

(30) Foreign Application Priority Data

Oct. 24, 2019 (NL) ...................................... 2024096

(51) Int. Cl.
*G02F 1/1333* (2006.01)
*G06F 1/16* (2006.01)

(52) U.S. Cl.
CPC ...... *G02F 1/133314* (2021.01); *G06F 1/1654* (2013.01)

(58) Field of Classification Search
CPC .......... G02F 1/133314; G02F 2201/46; G02F 1/133317; G06F 1/1654; G06F 1/1637; G06F 1/1679
See application file for complete search history.

(56) References Cited

U.S. PATENT DOCUMENTS 12,050,375 B2 * 7/2024 Ravenscroft ...... G02F 1/133317
2006/0138784 A1 * 6/2006 Wang .................... E05C 9/1875
292/24

* cited by examiner

*Primary Examiner* — Charles S Chang
(74) *Attorney, Agent, or Firm* — Alleman Hall & Tuttle LLP

(57) ABSTRACT

Examples are disclosed that relate to securing a display screen of a display device to a body of the display device. One example provides a display device including a body, a display screen, and a connecting structure comprising a tab component having one or more tabs, the tab component being coupled to one of the display screen and the body, a hook component including one or more hooks complementary to the one or more tabs, the hook component coupled to the other of the display screen and the body, the tab component and the hook component being moveable relative to one another to selectively engage the one or more tabs with the one or more hooks, and an actuation mechanism accessible from an exterior side of the body, the actuation mechanism being actuatable to engage the tab component and the hook component.

20 Claims, 9 Drawing Sheets

CONNECTING DISPLAY SCREEN TO DEVICE BODY

CROSS REFERENCE TO RELATED APPLICATIONS

The present application is a continuation of U.S. Non-Provisional patent application Ser. No. 17/754,378 filed Mar. 31, 2022, which is a U.S. National Phase of International Patent Application Serial No. PCT/US2020/056438 entitled "CONNECTING DISPLAY SCREEN TO DEVICE BODY", filed Oct. 20, 2020, which claims priority to Netherlands Patent Application Serial No. 2024096, filed Oct. 24, 2019, the entire contents of each of which are hereby incorporated by reference for all purposes.

BACKGROUND

Display devices commonly include a display screen coupled to a device body. Display devices with thin profiles may utilize an adhesive (e.g. a pressure sensitive adhesive) or mechanical snap-fit components to couple a display screen to a device body. Such connections may help to avoid the use of bulky brackets and/or wide bezels.

SUMMARY

Examples are disclosed that relate to removably securing a display screen to a body of a display device. One example provides a display device comprising a body, a display screen, and a connecting structure comprising a tab component having one or more tabs, the tab component being coupled to one of the display screen and the body, a hook component comprising one or more hooks complementary to the one or more tabs, the hook component coupled to the other of the display screen and the body, the tab component and the hook component being moveable relative to one another to selectively engage the one or more tabs with the one or more hooks, and an actuation mechanism accessible from an exterior side of the body, the actuation mechanism being actuatable to engage the tab component and the hook component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Display replacement is a common repair for display devices, both for devices dropped during use and devices damaged during manufacturing. Examples of display devices include laptop computing devices, tablet computing devices, mobile phones, televisions, and computer monitors. Various repair and/or diagnostic services also may involve removing a display screen to access internal hardware.

As mentioned above, a display screen may be connected to a display device body via snap fit connections or adhesives, as examples. However, each of these connections poses various drawbacks. For example, snap-fit components may not retain a screen as securely as an adhesive, and/or may provide less structural rigidity and exhibit poor flatness. Adhesive connections may provide a more uniform distribution of the retention force compared to snap-fit components, but may be difficult to separate without damaging the display screen.

Some display devices may be configured to be disassembled via a debonding tool that utilizes heating plates to heat edges of the display screen where the display screen is adhered to the device body. After softening the adhesive via heat, the debonding tool may use suction to pull the display screen away from the device body gently. While this may help to prevent damage to a display screen during removal, such a debonding process may be time-consuming, expensive, and require use of specialized tools.

Accordingly, examples are disclosed that relate to securing a display screen to a display device body in a manner that may facilitate display screen removal. Briefly, the disclosed examples utilize a connecting structure comprising a tab component coupled to one of a display screen and device body, and a complementary hook component coupled to the other of the display screen and device body. The tab component and hook component are moveable relative to one another to selectively and reversibly couple the display screen to the device body via an actuation mechanism accessible from an exterior side of the device body. As described in more detail below, such a connection may be operated without using special equipment and may provide for the simple and repeatable removal of the display without damage from disassembly, thereby increasing serviceability compared to adhesives, as well as facilitating removal and re-installation of a display screen without generating waste materials. Further, such a connection may allow for a relatively thinner bezel than an adhesive connection.

Figure 1A:
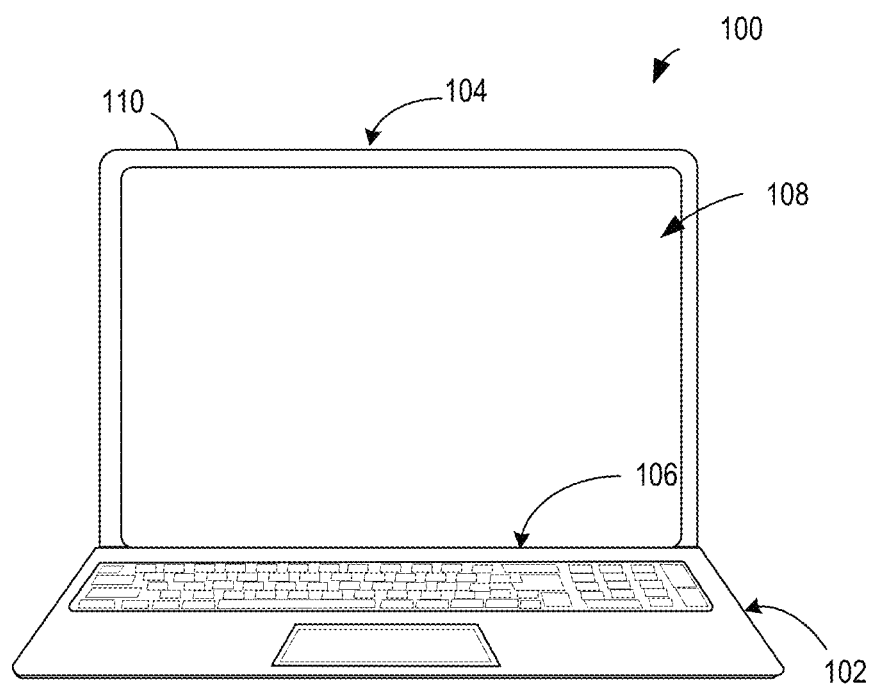
FIGS. 1A-1B show an example display device in the form of a laptop computer.
Figure 1B:
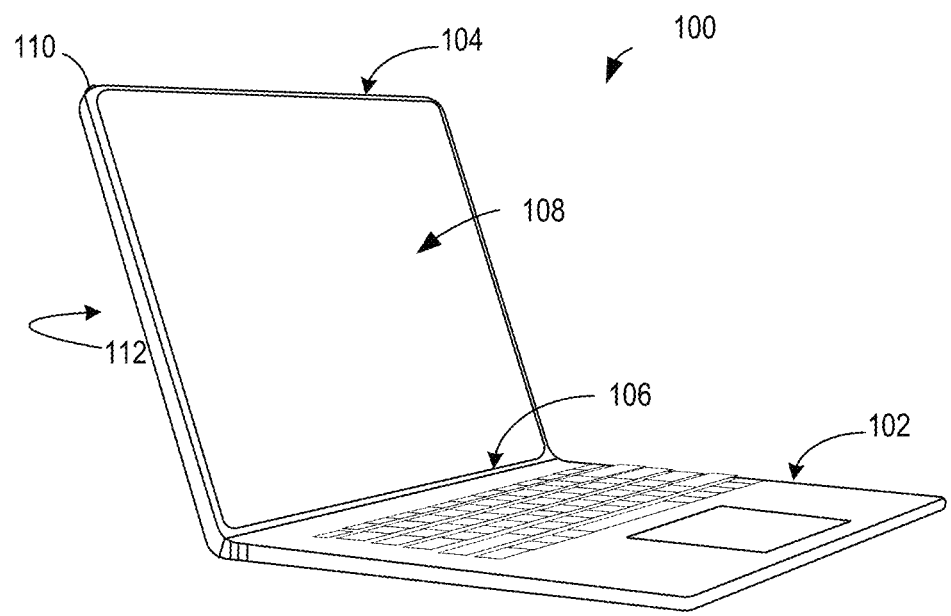

FIGS. 1A-1B show an example display device 100 in the form of a laptop computer. The display device 100 includes a keyboard portion 102 and a display portion 104 coupled to the keyboard portion 102 via a hinge 106. The display portion 104 includes a display screen 108 and a body 110 that supports the display screen 108. Other example display devices include tablet computers, mobile phones, computer monitors, televisions, and desktop all-in-one computers.

Figure 2:
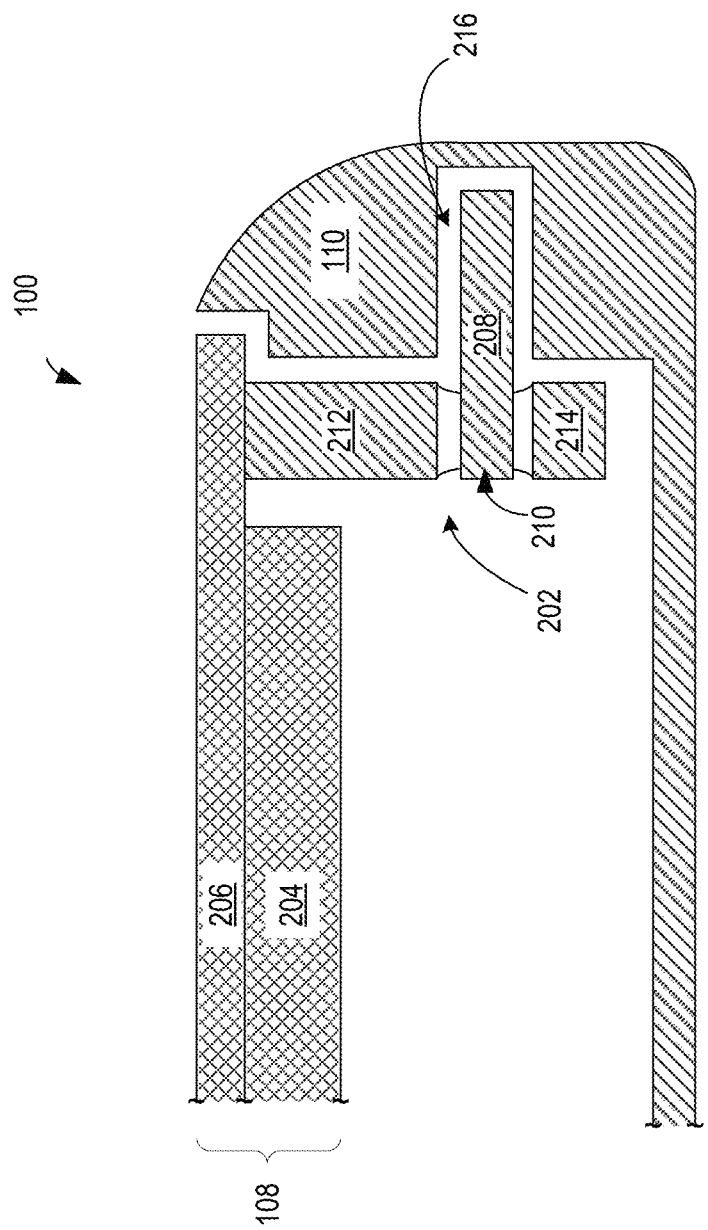
FIG. 2 schematically illustrates an example connecting structure for securing a display screen of a display device to a body of the display device.

FIG. 2 schematically shows a sectional view of the display portion 104 (taken along line 2-2 of FIG. 3), and illustrates a connecting structure 202 that couples the body 110 to the display screen 108. The term "display screen" as used herein refers to an image-producing device 204 (e.g. an organic light emitting diode (OLED), liquid crystal, quantum dot light emitting diode (QLED), or other display panel) as well as a protective cover sheet 206 (e.g. glass). In some examples, the display screen 108 also may include a touch sensor configured to sense touch inputs to the display screen 108.

The depicted connecting structure 202 functions as a cinching mechanism that selectively and removably secures the display screen 108 to the body 110. The connecting structure 202 includes a tab component 208 having one or more tabs 210, a hook component 212 having one or more hooks 214 complementary to the one or more tabs 210, and an actuation mechanism (not shown in FIG. 2) that is accessible from an exterior side of the body 110. The tab component 208 and the hook component 212 are movable relative to one another to selectively engage or disengage the one or more tabs 210 with the one or more hooks 214.

In the example of FIG. 2, the tab component 208 is slidably positioned within a slot 216 formed in the body 110, and the hook component 212 is fixed to a back surface of the protective cover sheet 206. While the disclosed examples are described in the context of the tab component 208 being coupled to the body 110 and the hook component 212 being coupled to the display screen 108, in other examples the tab component 208 may be coupled to the display screen 108 and the hook component 212 to the body 110.

Figure 3:
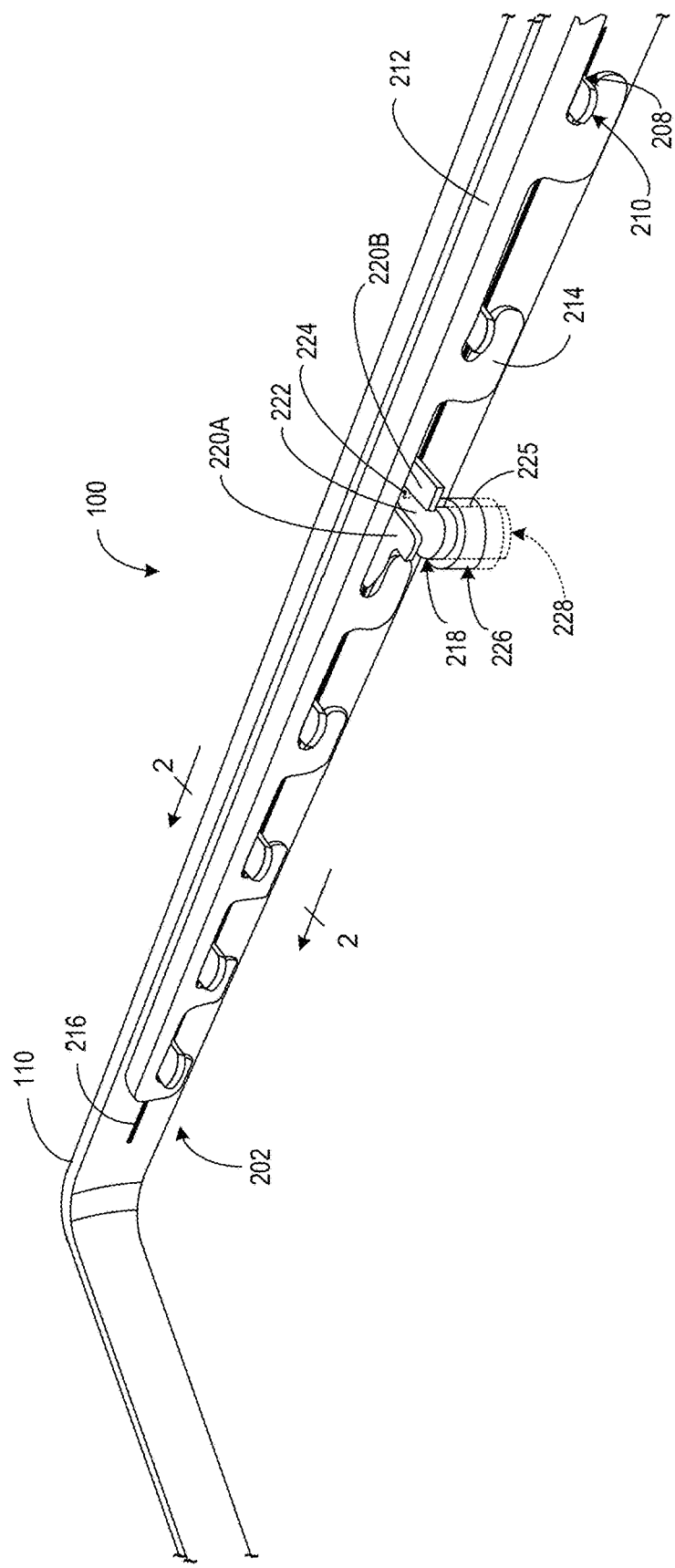
FIG. 3 illustrates a perspective view of the example connecting structure of FIG. 2.

FIG. 3 shows a perspective view of the display device 100 of FIG. 2, with the display screen removed to illustrate the connecting structure 202 components in more detail. In this figure, the slot 216 can be seen extending along an interior side of the body 110. The slot 216 may have any suitable depth depending upon the thickness of the device body 110 and dimension of the tab component 208. In some examples, the slot 216 comprises a depth in a range of 0.5 to 3.0 millimeters (mm). The tab component 208 is inserted in the slot 216 such that the one or more tabs 210 extend in a direction away from the slot. In some examples, the slot 216 may be formed along only a portion of the interior side of the body 110, while in other examples the slot may extend along an entirety of the inner side of the body. Further, the display device 100 may include slots extending along other interior sides to accommodate other connecting structures for other device sides.

The one or more hooks 214 and the one or more tabs 210 may be configured to provide a selected force between the display screen 108 and the body 110 based upon a particular device in which the connecting structure is being used. Further example, the one or more hooks and/or the one or more tabs each may comprise a sloped surface configured to increase the force at which the display screen 108 is pulled against the body 110 as the hook component 212 and tab component 208 progressively engage.

The tab component 208 and the hook component 212 may each be formed from any suitable material(s). In some examples, the tab component 208 and/or the hook component 212 each is formed from a stamped metal sheet. In other examples, the tab component 208 and/or the hook component 212 each is formed from a molded polymeric material having suitable hardness and wear resistance, such as polycarbonate, acrylonitrile butadiene styrene (ABS), polyethylene terephthalate (PET), or nylon. Example methods for forming the tab component 208 and/or the hook component 212 include stamping, molding, casting, and 3D printing, depending upon the material or material from which these parts are formed.

Figure 4:
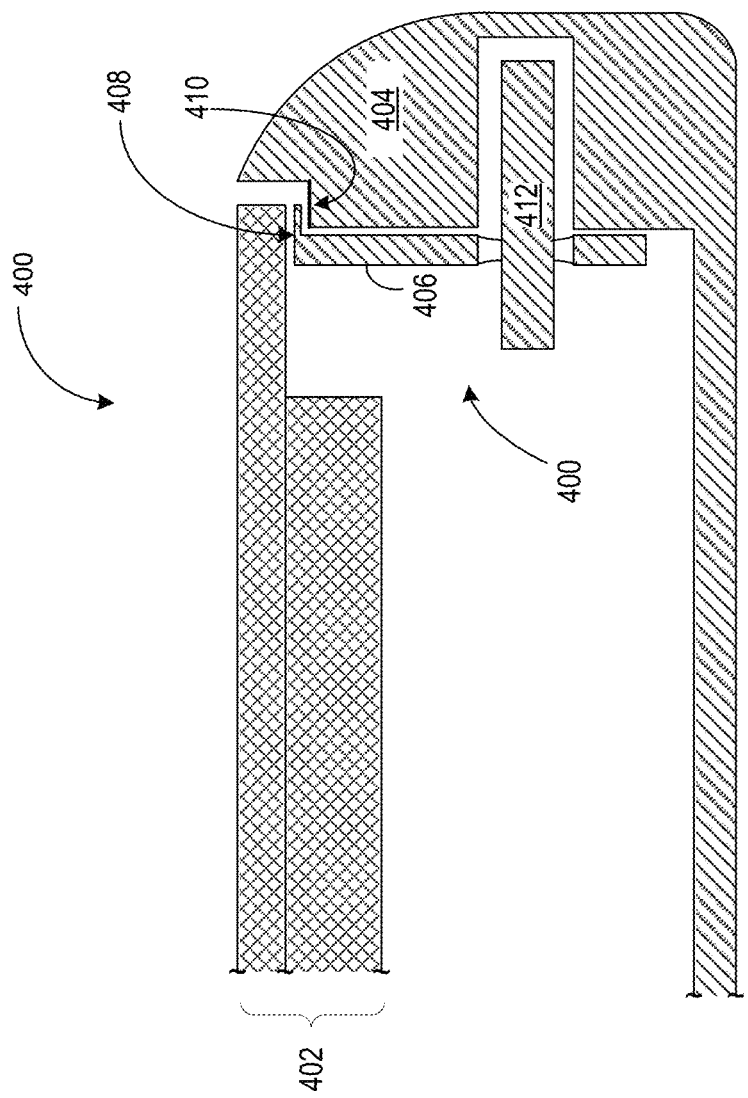
FIG. 4 schematically illustrates another example connecting structure for securing a display screen to a body of a display device.

FIG. 4 depicts another example connecting structure 400 suitable for removably connecting a display screen 402 to a display device body 404. In this example, the hook component 406 is thinner than the hook component 212 shown in FIGS. 2 and 3, and comprises a flange 408 configured to provide a suitably large bonding area at which the hook component 406 is adhered to the display screen 402. Such a structure may allow a display device to have a thinner bezel.

The connecting structure 400 also comprises a compressible structure 410 coupled to one of the body 404 and the hook component 406 at location where the body 404 interfaces the hook component 406. The compressible structure 410 is configured to compress when the hook component 406 and tab component 412 engage, thereby allowing a firm fit due to opposing force provided by the compressible material. This may help to provide an amount of travel distance between the body 404 and the display screen 402 when the connecting structure is engaged while ensuring a firm fit. Any suitable material(s) may be used as the compressible structure 410. In some examples, the compressible structure 410 comprises an elastomer or resilient polymer foam. In other examples, the compressible structure may comprise a mechanically compressible structure, such as a leaf spring.

Returning to FIG. 3, the connecting structure 202 comprises an actuation mechanism that is actuatable to selectively engage the tab component 208 and the hook component 212. Any suitable actuation mechanism may be used. In FIG. 3, the actuation mechanism takes the form of a cam 218 positioned between a first follower 220A and a second follower 220B of the tab component. The cam 218 comprises a shaft 225 to which a cam arm 222 is attached, and a pin 224 extending upward from the cam arm 222. In this example, rotation of the shaft 225 (e.g. via a screwdriver, hex wrench or other suitable tool) causes the pin 224 to apply a force to the first follower 220A or the second follower 220B, depending upon the direction of rotation. Force applied to the first follower 220A or the second follower 220B causes the tab component 208 to translate relative to the hook component 212, thereby engaging or disengaging the one or more tabs 210 and the one or more hooks 214.

The actuation mechanism is accessible from an exterior side of the body 110. In the example of FIG. 3, the shaft 225 is positioned within a boss 226 formed in the body 110 that extends to an exterior, non-display side of the body 110 (as indicated by dashed lines in FIG. 3) such that a mechanical interface 228 of the actuation mechanism is accessible from the exterior side of the body 110. The mechanical interface 228 of the actuation mechanism may comprise a hand tool interface configured to be used with common tools (e.g. a screwdriver, a hex wrench, etc.). In other examples, the mechanical interface 228 may comprise a lever, a magnet, or any other suitable structure.

The disclosed connecting structure 202 may allow for the quick and easy attachment of a display screen to a display device body by simply mounting the hook component 212 and tab component 208 to respectively to one of and the other of the device body and the display screen, installing cam 218 into boss 226, and using the actuation mechanism to engage the hook component 212 and the tab component 208.

Figure 5:
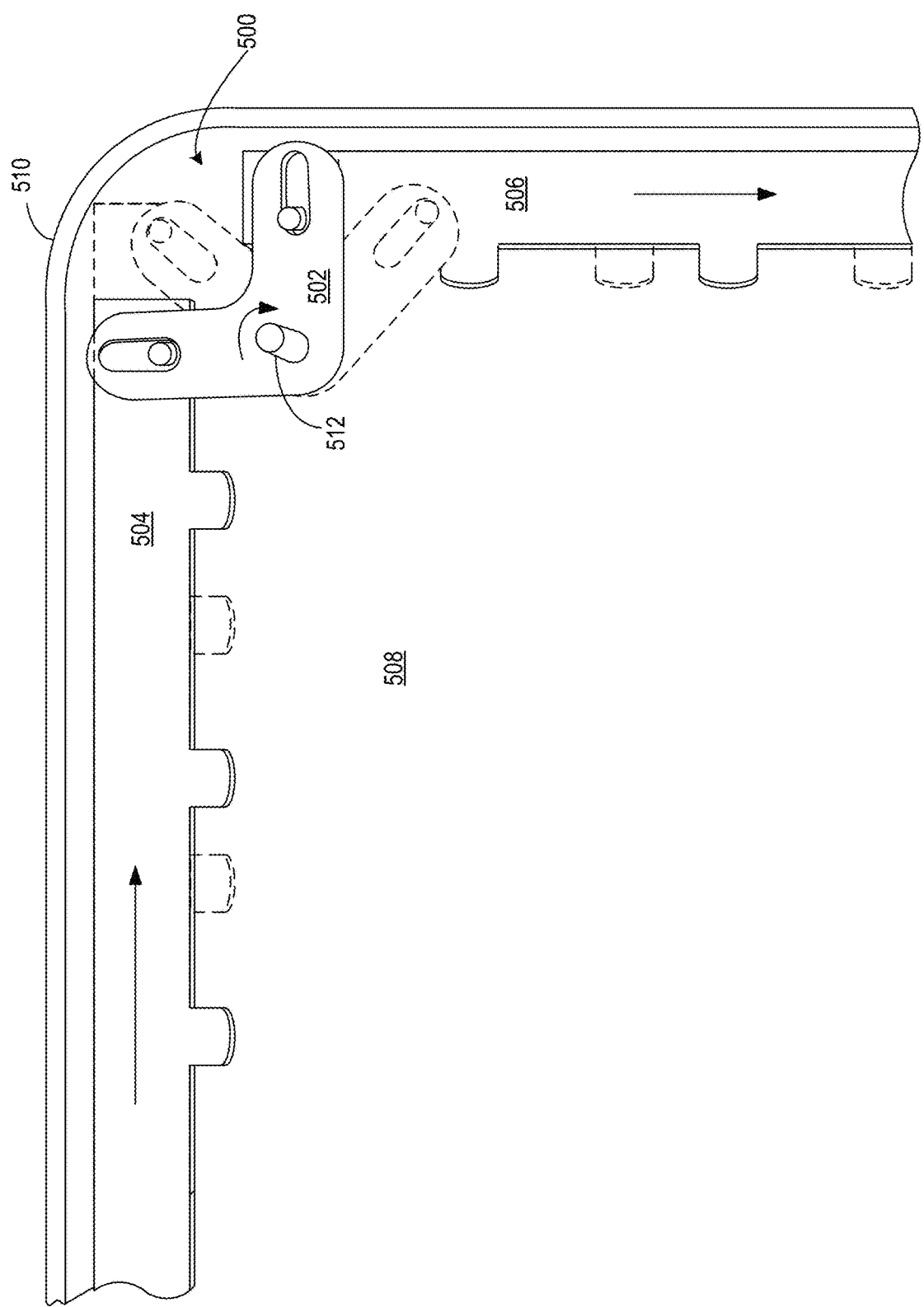
FIG. 5 schematically illustrates aspects of an example actuation mechanism comprising a rotatable linkage.

In some examples, a display device may include two or more connecting structures arranged along different sides of the display screen 108. Rather than including a separate actuation mechanism along each side of the display screen 108, such a display device may include a single actuation mechanism configured to actuate both of two or more connecting structures. FIG. 5 schematically shows an example actuation mechanism 500 configured to provide a single point of actuation for two connecting structures. The actuation mechanism 500 comprises a rotatable linkage 502 connecting a first connecting structure 504 arranged along a first side of a display screen 508 to a second connecting structure 506 arranged along a second side of the display screen 508 that is adjacent to the first side.

The rotatable linkage 502 is rotatable to selectively engage the one or more tabs and the one or more hooks of the first connecting structure 504 and to selectively engage the one or more second tabs and the one or more second hooks of the second connecting structure 506. In this example, the rotatable linkage moves the tab components. In other examples, the rotatable linkage may move the hook components.

While a single point of actuation 512 for two connecting structures 504 and 506 is depicted in FIG. 5, the single point of actuation 512 also may be used to actuate three or more connecting structures. In one specific example, a display device comprises a first connecting structure extending at least a portion of a left side of the display screen 508, a second connecting structure extending across a bottom side of the display screen 508, a first rotational linkage connecting the first connecting structure to the second connecting structure, a third connecting structure extending at least a portion of a right side of the display screen 508, and a second rotational linkage connecting the second connecting structure to the third connecting structure. In such an example, a single actuator may be rotated to engage the hooks and tabs of each of the first, second, and third connecting structures.

Returning briefly to FIG. 3, in some examples, the connecting structure 202 (or connecting structure 400 in FIG. 4) may extend along substantially an entire length of a side of the display screen. However, display devices often have various hardware components that extend through a display device body to implement interfaces. Examples include buttons, cable ports, speakers and microphones. Thus, to accommodate such devices while maintaining a thin device profile, in some examples a display device may include a connecting structure of the type shown in FIGS. 2-4 along a portion of a side of a display screen, and also include a different securing mechanism, with a lesser depth, along a different portion of the same side of the display screen to accommodate such interface hardware.

Figure 6:
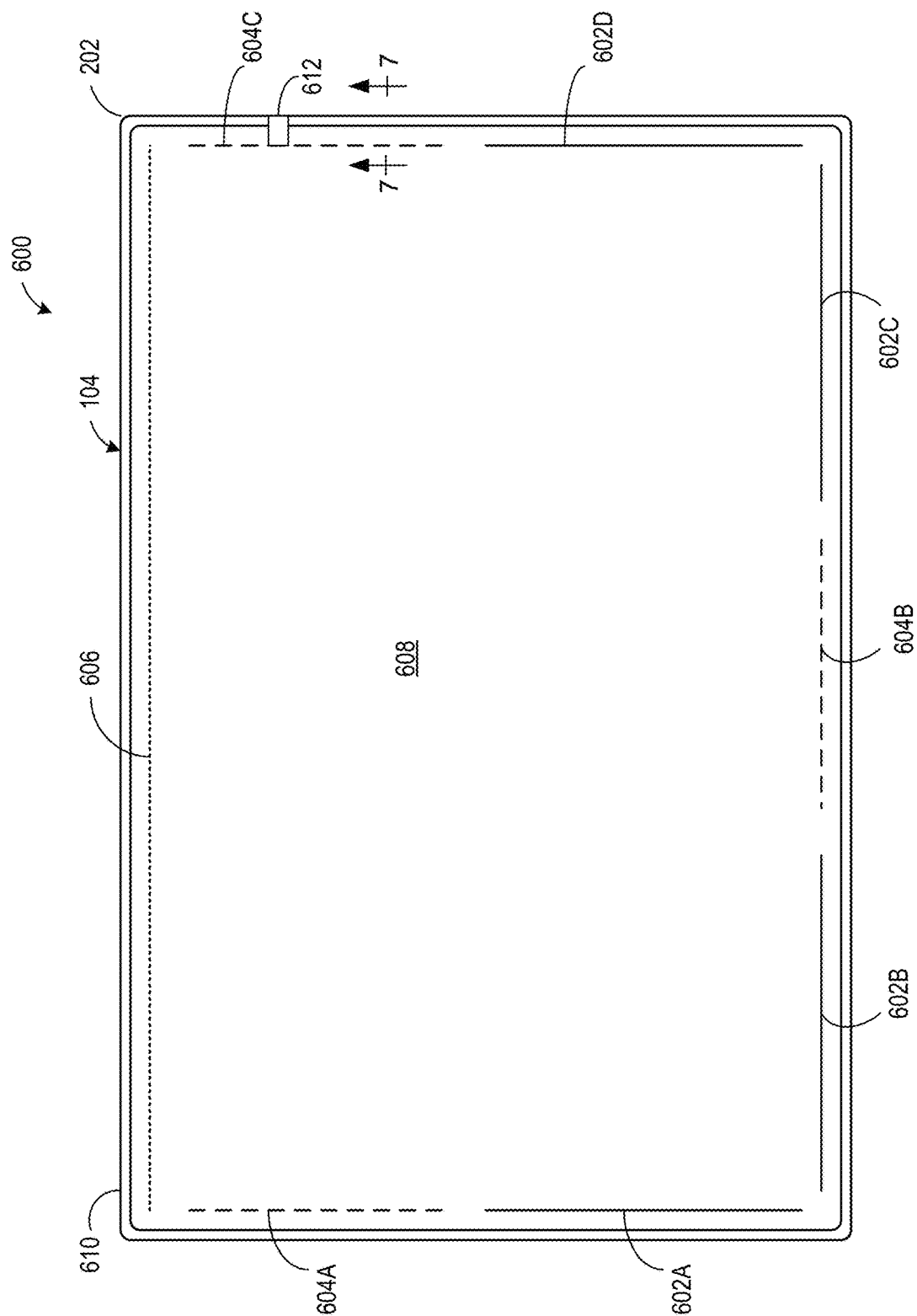
FIG. 6 schematically illustrates example regions of a display device for integrating buttons, ports, and/or other interface hardware.
Figure 7:
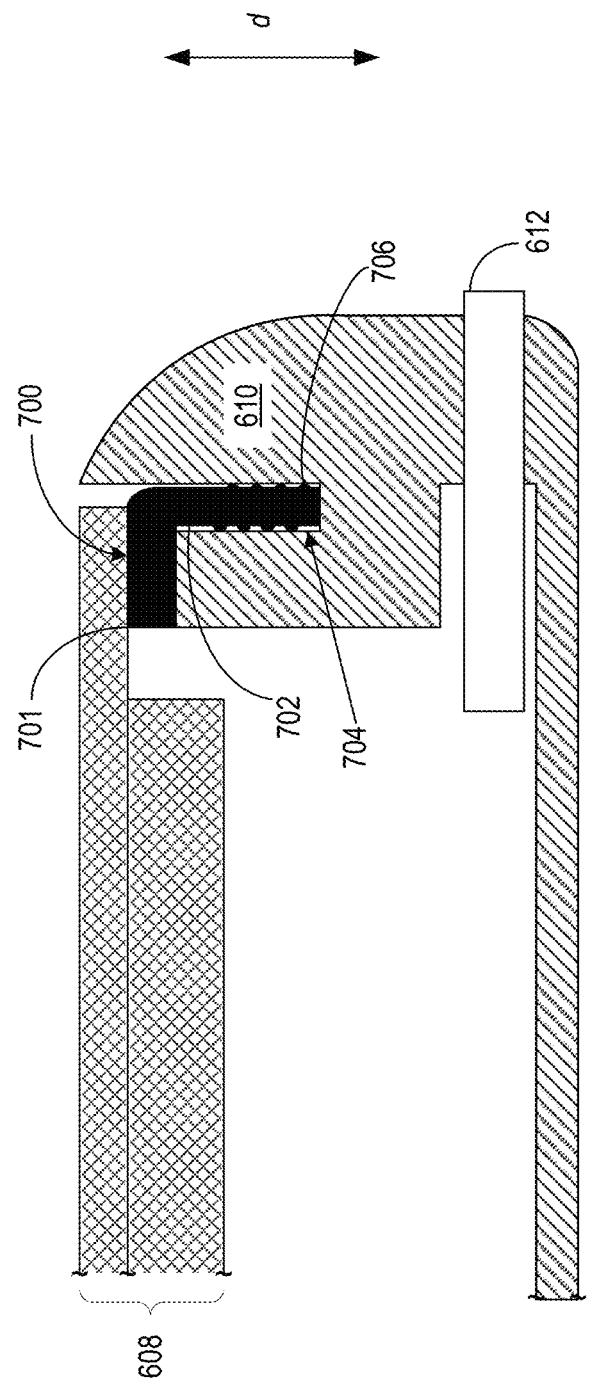
FIG. 7 schematically illustrates an example frictional connector for securing a display screen of a display device to a body of the display device via a frictional press fit in a region comprising interface hardware.

FIG. 6 schematically a display device 600, and illustrates portions 602A-602D of a side of a display screen 608 that may be secured to the body 610 via a connecting structure 202 (FIG. 2) or 400 (FIG. 4) (as examples), and also portions 604A-604C of the side that may be secured to the body 610 via a different connecting structure to accommodate interface hardware. FIG. 7 depicts a sectional view of the display device 600, taken along line 7-7 of FIG. 6, to illustrate an example frictional connecting structure 700 that may be used accommodate hardware interface components. The frictional connecting structure 700 comprises a flange 701 that is coupled to the display screen 608 (e.g. via an adhesive), and a protrusion 702 that extends into a complementary slot 704 by a frictional press fit. In FIG. 7, the complementary slot 704 is formed within the body 610, but also may be implemented in a component attached to the body 610 in other examples. In yet other examples, the frictional connecting structure 700 may be coupled to the body 610 and the protrusion 702 may be held in a complementary slot on the display screen 608 (or a complementary slot of a separate structure coupled to the display screen 608).

The frictional press fit secures the display screen 608 to the body 610 in a manner that utilizes a relatively small amount of space in a thickness dimension d (e.g. 1-2 mm), and thus provides enough vertical space for a hardware interface component. An example interface hardware component is shown schematically as a button 612.

The frictional connecting structure 700 may be formed from any suitable material, and comprise any suitable configuration of feature(s) able to achieve a frictional press fit in the complementary slot. For example, the protrusion 702 may be formed from sheet metal, and include one or more dimples 706 on a surface of the protrusion 702 that provide spring force when inserted in the complementary slot 704. In other examples, the protrusion may be formed from a polymer that is deformable, and may include surface features (e.g. bumps) that compress and deform when the protrusion is press-fit into the complementary slot 704. Other examples of display devices may not include such interface hardware extending through the body. In such examples, a connecting structure of a type shown in FIGS. 2-4 may extend substantially along an entire length of a side of the display screen 608.

Figure 8:
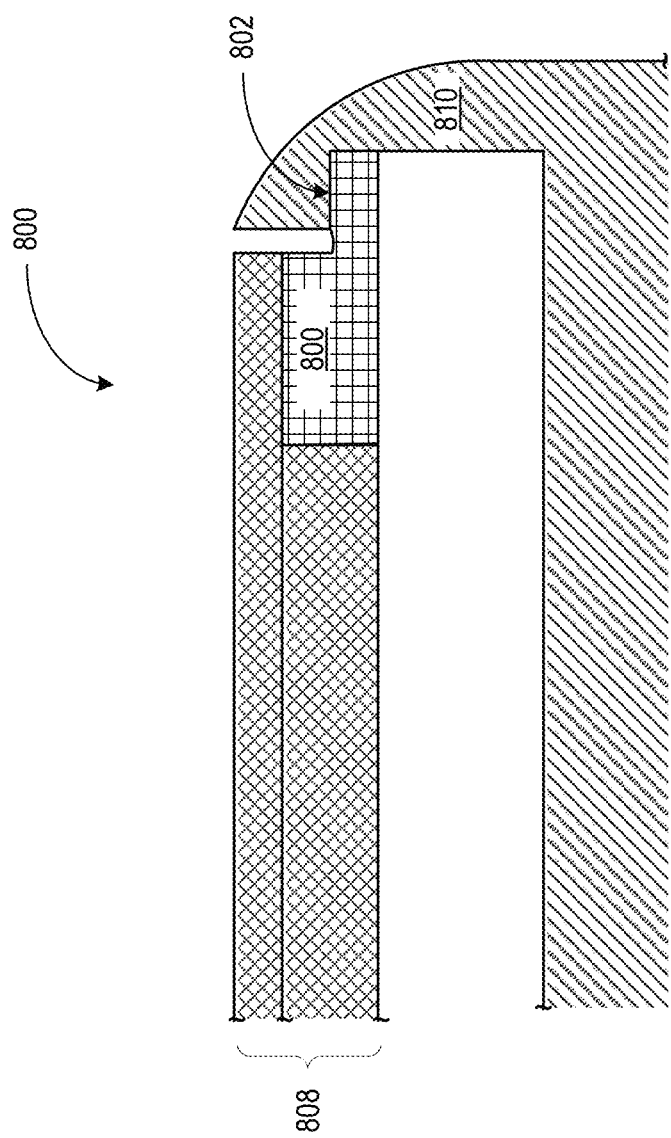
FIG. 8 schematically illustrates an example fin for securing a display screen to a body of a display device.

FIG. 8 shows an example display device 800 comprising another example connecting structure that may be used along a side of a display device to help retain a display screen 808 within a display device body 810. The connecting structure of FIG. 8 may be used, for example, where other types of connecting structures (e.g. those of FIGS. 2, 4 and/or 7) are used along other sides. In this example, a fin 801 is coupled to the display screen 808 and inserted behind an interior ledge 802 of the body 810 to hold the display screen 808 to the body 810. While depicted as having a generally flat profile where the fin 801 extends beneath the ledge 802, in other examples a fin may have other shapes, such as a hook shape that engages with an interior ledge of the body 810 to provide retention.

The fin 801 may extend along substantially an entire length of a side of the display screen 808, or may extend a portion of a side of the display screen 808. Further, in some examples, multiple fins may be provided along a length of a side of a display screen. During installation of the display screen 808, the display screen 808 may be inserted at an angle to position the fin 801 beneath the interior ledge 802 of the body 810, and then set into the body 810 and secured via other connecting structures along other sides.

Figure 9:
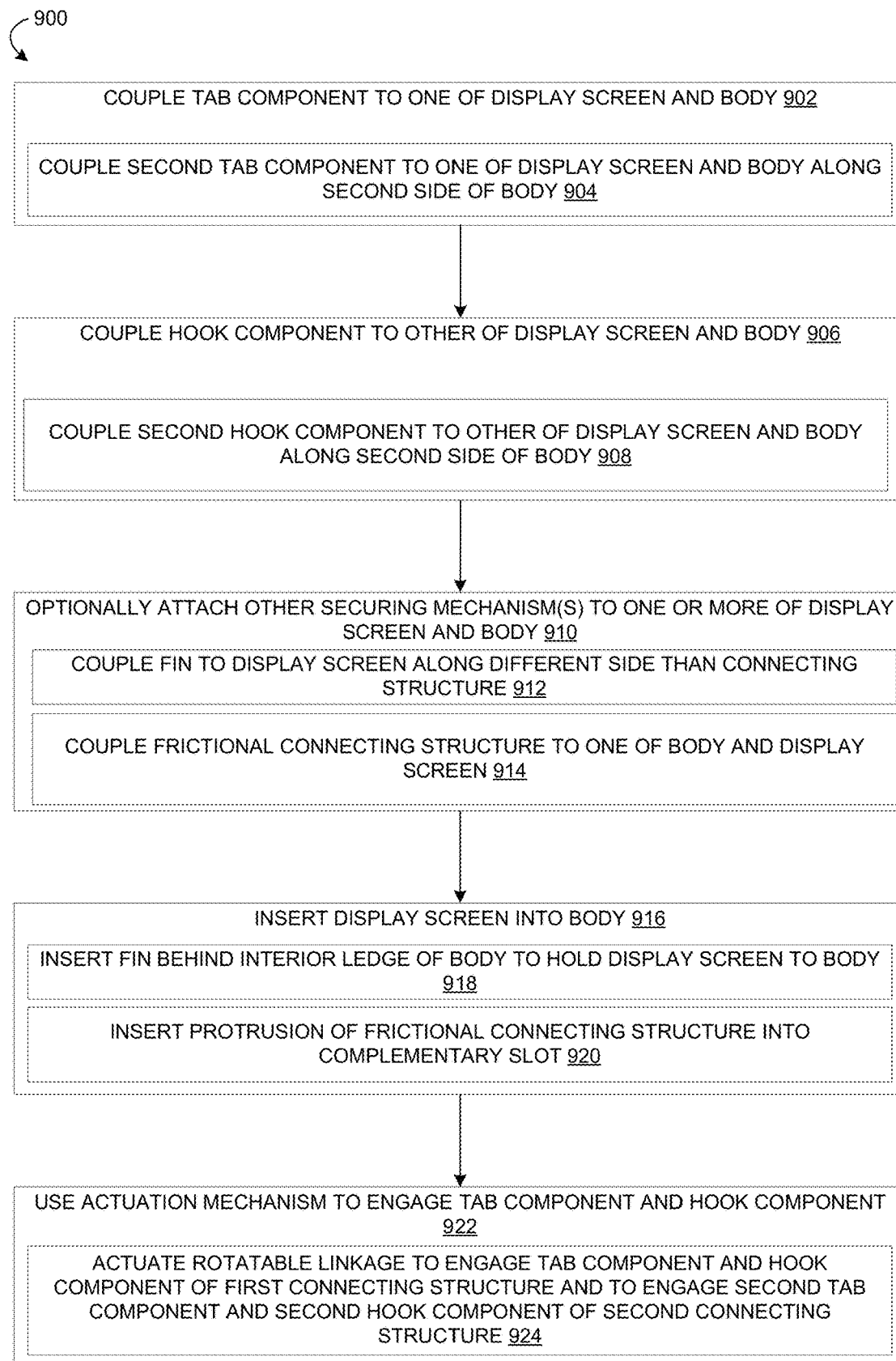
FIG. 9 is a flowchart illustrating an example method of securing a display screen to a body of a display device.

FIG. 9 is a flowchart illustrating an example method 900 for securing a display screen to a body of a device. In various examples, method 900 may be implemented as a manufacturing process or as a repair process.

At 902, method 900 comprises coupling a tab component of a connecting structure to one of the display screen and the body. In some examples, the tab component may be a first tab component, and method 900 optionally may comprise coupling a second tab component of a second connecting structure to a one of the display screen and the body along a different side than the first tab component, as indicated at 904. As described above, the tab component comprises one or more tabs, and the second tab component comprises one or more second tabs.

At 906, method 900 comprises coupling a hook component of the connecting structure to the other of the display screen and the body. In some examples, the hook component may be a first hook component, and method 900 optionally may comprise coupling a second hook component of the second connecting structure to the other of the display screen and the body, as indicated at 908. As described above, the hook component comprises one or more hooks complementary to the one or more tabs, and the second hook component comprises one or more second hooks complementary to the one or more second tabs.

Method 900 optionally may comprise attaching other securing mechanism(s) to one or more of the display screen and the body, as indicated at 910. In some examples, attaching other securing mechanism(s) may comprise coupling a fin to a different side of the display screen than the connecting structure, as indicated at 912. Further, in some examples, a display device may include a different securing mechanism along a different portion of a same side of the display screen as the connecting structures of processes 902 and 906, e.g. to accommodate a hardware interface component that extends through a display device body. Thus, attaching other securing mechanism(s) may comprise coupling a frictional connecting structure to one of the body and the display screen, as indicated at 914.

At 916, method 900 comprises inserting the display screen into the body. Inserting the display screen into the body may comprise inserting the fin behind an interior ledge of the body to hold the display screen to the body, as indicated at 918. Inserting the display screen into the body also may comprise inserting a protrusion of the frictional connecting structure into a complementary slot such that the protrusion is held in the complementary slot by a frictional press fit, as indicated at 920.

At 922, method 900 comprises using the actuation mechanism to engage the tab component and the hook component. As described above, the actuation mechanism is accessible from an exterior side of the body. In some examples, the actuation mechanism comprises a cam having a rotatable shaft coupled to a cam arm and a pin extending upwards from the cam arm. Rotating the rotatable shaft causes the pin to push against one of the hook component and the tab component, and thereby move the tab component and the hook component into or out of engagement depending upon the direction of rotation. In other examples, the actuation mechanism comprises a rotatable linkage connecting the first connecting structure to the second connecting structure. Actuating the actuation mechanism may comprise rotating the rotatable linkage to engage the tab component and hook component of the first connecting structure and to engage the second tab component and second hook component of the second connecting structure, as indicated at 924. In yet other examples, any other suitable actuation mechanism may be used.

While described herein in the context of display devices, the disclosed examples may alternatively be used in other contexts. For example, the disclosed examples may be used to selectively secure a door or access panel to a machine body.

Another example provides a display device, comprising a body, a display screen, and a connecting structure comprising a tab component having one or more tabs, the tab component being coupled to one of the display screen and the body, a hook component comprising one or more hooks complementary to the one or more tabs, the hook component coupled to the other of the display screen and the body, the tab component and the hook component being moveable relative to one another to selectively engage the one or more tabs with the one or more hooks, and an actuation mechanism accessible from an exterior side of the body, the actuation mechanism being actuatable to engage the tab component and the hook component. In such an example, the hook component may additionally or alternatively be adhered to the display screen. In such an example, a portion of the tab component may additionally or alternatively be positioned within a slot formed in the body. In such an example, the actuation mechanism may additionally or alternatively comprise a cam positioned between a first follower and a second follower of the first connecting structure. In such an example, the connecting structure may additionally or alternatively be a first connecting structure arranged along a first side of the display screen, the display device may additionally or alternatively comprise a second connecting structure arranged along a second side of the display screen, the second connecting structure may additionally or alternatively comprise a second tab component having one or more second tabs, the second tab component being coupled to the one of the display screen and the body, and a second hook component comprising one or more second hooks complementary to the one or more second tabs, the second hook component coupled to the other of the display screen and the body, the second tab component and the second hook component being moveable relative to one another to selectively engage the one or more second tabs with the one or more second hooks. In such an example, the actuation mechanism may additionally or alternatively comprise a rotatable linkage connecting the first connecting structure to the second connecting structure, the rotatable linkage being rotatable to engage the tab component and the hook component of the first connecting structure and to engage the second tab component and the second hook component of the second connecting structure. In such an example, the display device may additionally or alternatively comprise a fin arranged along a different side of the display screen than the connecting structure, the fin inserted behind an interior ledge of the body to hold the display screen to the body. In such an example, the fin may additionally or alternatively be adhered to the display screen. In such an example, the connecting structure may additionally or alternatively be arranged along a first portion of a side of the display screen, the display device may additionally or alternatively comprise a frictional connecting structure extending along a second portion of the side of the display screen, the frictional connecting structure coupled to one of the body and the display screen, the frictional connecting structure comprising a protrusion that is held in a complementary slot on the other of the body and the display screen by a frictional press fit. In such an example, the connecting structure may additionally or alternatively comprise a metal.

Another example provides a method for securing a display screen to a body of a device, the method comprising coupling a tab component of a connecting structure to one of the display screen and the body, the tab component having one or more tabs, coupling a hook component of the connecting structure to the other of the display screen and the body, the hook component having one or more hooks complementary to the one or more tabs, inserting the display screen into the body such that the tab component and the hook component are moveable relative to one another to selectively engage the one or more tabs with the one or more hooks, and actuating an actuation mechanism to engage the tab component and the hook component, the actuation mechanism being accessible from an exterior side of the body. In such an example, the connecting structure may additionally or alternatively be a first connecting structure, the method may additionally or alternatively comprise, prior to inserting the display screen into the body, coupling a second tab component of a second connecting structure to the one of the display screen and the body along a second side of the display screen, the second tab component having one or more second tabs, and coupling a second hook component of the second connecting structure to the other of the display screen and the body along the second side of the display screen, the second hook component having one or more second hooks complementary to the one or more second tabs. In such an example, the actuation mechanism may additionally or alternatively comprise a rotatable linkage connecting the first connecting structure to the second connecting structure, and actuating the actuation mechanism may additionally or alternatively comprise rotating the rotatable linkage to engage the tab component and the hook component of the first connecting structure and to engage the second tab component and the second hook component of the second connecting structure. In such an example, the method may additionally or alternatively comprise, prior to inserting the display screen into the body, coupling a fin to a different side of the display screen than the connecting structure, and inserting the display screen into the body may additionally or alternatively comprise inserting the fin behind an interior ledge of the body to hold the display screen to the body. In such an example, the connecting structure may additionally or alternatively be arranged along a first portion of the side of the display screen, the method may additionally or alternatively comprise, prior to inserting the display screen into the body, coupling a frictional connecting structure to one of the body and the display screen, the frictional connecting structure extending along a second portion of the side of the display screen, and inserting the display screen into the body may additionally or alternatively comprise inserting a protrusion of the frictional connecting structure into a complementary slot such that the protrusion is held in the complementary slot by a frictional press fit.

Another example provides a connecting structure for removably attaching a display screen of a display device to a body of the display device, the connecting structure comprising a tab component having one or more tabs, the tab component configured to be coupled to one of the display screen and the body, a hook component comprising one or more hooks complementary to the one or more tabs, the hook component configured to be coupled to the other of the display screen and the body, the tab component and the hook component being moveable relative to one another to selectively engage the one or more tabs with the one or more hooks, and an actuation mechanism actuatable to engage the tab component and the hook component. In such an example, the hook component may additionally or alternatively be configured to be adhered to the display screen, and a portion of the tab component may additionally or alternatively be configured to be inserted within a slot formed in the body. In such an example, the actuation mechanism may additionally or alternatively comprise a hand tool interface on an end of a shaft. In such an example, the shaft may additionally or alternatively be coupled to a cam arm, the cam arm may additionally or alternatively comprise a pin configured to be positioned between a first follower and a second follower of the tab component. In such an example, the connecting structure may additionally or alternatively comprise a second tab component having one or more second tabs, the second tab component configured to be coupled to the one of the display screen and the body along a different side of the display screen than the tab component, and a second hook component comprising one or more second hooks complementary to the one or more second tabs, the second hook component configured to be coupled to the other of the display screen and the body along the different side of the display screen, and the actuation mechanism may additionally or alternatively comprise a rotatable linkage connecting the first tab component to the second tab component, the rotatable linkage being actuatable to engage the tab component and the hook component and to engage the second tab component and the second hook component.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A display device, comprising:
    a body;
    a display screen; and
    a connecting structure comprising
        a tab component having one or more tabs, the tab component being coupled to one of the display screen or the body, wherein a portion of the tab component is moveably positioned within a slot formed in one of the display screen or the body,
        a hook component comprising one or more hooks complementary to the one or more tabs, the hook component fixedly coupled to the other of the display screen or the body, the tab component and the hook component being moveable relative to one another to selectively engage the one or more tabs with the one or more hooks, and
        an actuation mechanism accessible from an exterior side of the body, the actuation mechanism being actuatable to engage the tab component and the hook component.

2. The display device of claim 1, wherein the hook component is adhered to the other of the display screen or the body.

3. The display device of claim 1, wherein the actuation mechanism comprises a cam positioned between a first follower and a second follower of the first connecting structure.

4. The display device of claim 1, wherein the connecting structure is a first connecting structure and is arranged along a first side of the display screen, the display device further comprising a second connecting structure arranged along a second side of the display screen, the second connecting structure comprising
    a second tab component having one or more second tabs, the second tab component being coupled to the one of the display screen or the body, and
    a second hook component comprising one or more second hooks complementary to the one or more second tabs, the second hook component coupled to the other of the display screen or the body, the second tab component and the second hook component being moveable relative to one another to selectively engage the one or more second tabs with the one or more second hooks.

5. The display device of claim 4, wherein the actuation mechanism further comprises a rotatable linkage connecting the first connecting structure to the second connecting structure, the rotatable linkage being rotatable to engage the tab component and the hook component of the first connecting structure and to engage the second tab component and the second hook component of the second connecting structure.

6. The display device of claim 1, further comprising a fin arranged along a different side of the display screen than the connecting structure, the fin inserted behind an interior ledge of the body to hold the display screen to the body.

7. The display device of claim 6, wherein the fin is adhered to the display screen.

8. The display device of claim 1, wherein the connecting structure is arranged along a first portion of a side of the display screen, the display device further comprising:
a frictional connecting structure extending along a second portion of the side of the display screen, the frictional connecting structure coupled to one of the body or the display screen, the frictional connecting structure comprising a protrusion that is held in a complementary slot on the other of the body or the display screen by a frictional press fit.

9. The display device of claim 1, wherein the connecting structure comprises a metal.

10. A method for securing a display screen to a body of a device, the method comprising:
coupling a tab component of a connecting structure to one of the display screen or the body, wherein a portion of the tab component is moveably positioned within a slot formed in the one of the display screen or the body, the tab component having one or more tabs;
coupling a hook component of the connecting structure to the other of the display screen or the body, the hook component having one or more hooks complementary to the one or more tabs;
inserting the display screen into the body such that the tab component and the hook component are moveable relative to one another to selectively engage the one or more tabs with the one or more hooks; and
actuating an actuation mechanism to engage the tab component and the hook component, the actuation mechanism being accessible from an exterior side of the body.

11. The method of claim 10, wherein the connecting structure is a first connecting structure, the method further comprising, prior to inserting the display screen into the body:
coupling a second tab component of a second connecting structure to one of the display screen or the body along a second side of the display screen, the second tab component having one or more second tabs, and
coupling a second hook component of the second connecting structure to the other of the display screen or the body along the second side of the display screen, the second hook component having one or more second hooks complementary to the one or more second tabs.

12. The method of claim 11, wherein the actuation mechanism comprises a rotatable linkage connecting the first connecting structure to the second connecting structure, and wherein actuating the actuation mechanism comprises rotating the rotatable linkage to engage the tab component and the hook component of the first connecting structure and to engage the second tab component and the second hook component of the second connecting structure.

13. The method of claim 10, further comprising:
prior to inserting the display screen into the body, coupling a fin to a different side of the display screen than the connecting structure; and
wherein inserting the display screen into the body comprises inserting the fin behind an interior ledge of the body to hold the display screen to the body.

14. The method of claim 10, wherein the connecting structure is arranged along a first portion of the side of the display screen, the method further comprising, prior to inserting the display screen into the body, coupling a frictional connecting structure to one of the body or the display screen, the frictional connecting structure extending along a second portion of the side of the display screen; and
wherein inserting the display screen into the body comprises inserting a protrusion of the frictional connecting structure into a complementary slot such that the protrusion is held in the complementary slot by a frictional press fit.

15. A connecting structure for removably attaching a display screen of a display device to a body of the display device, the connecting structure comprising:
a tab component having one or more tabs, the tab component configured to be coupled to one of the display screen or the body;
a hook component comprising one or more hooks complementary to the one or more tabs, the hook component configured to be fixedly coupled to the other of the display screen or the body, the tab component and the hook component being moveable relative to one another to selectively engage the one or more tabs with the one or more hooks; and
an actuation mechanism actuatable to engage the tab component and the hook component.

16. The connecting structure of claim 15, wherein the hook component is configured to be adhered to the display screen.

17. The connecting structure of claim 15, wherein the actuation mechanism comprises a hand tool interface on an end of a shaft.

18. The connecting structure of claim 17, wherein the shaft is coupled to a cam arm, the cam arm comprising a pin configured to be positioned between a first follower and a second follower of the tab component.

19. The connecting structure of claim 15, further comprising:
a second tab component having one or more second tabs, the second tab component configured to be coupled to one of the display screen or the body along a different side of the display screen than the first tab component; and
a second hook component comprising one or more second hooks complementary to the one or more second tabs, the second hook component configured to be coupled to the other of the display screen or the body along the different side of the display screen; and
wherein the actuation mechanism comprises a rotatable linkage connecting the first tab component to the second tab component, the rotatable linkage being actuatable to engage the tab component and the hook component and to engage the second tab component and the second hook component.

20. The connecting structure of claim 15, wherein the tab component is configured to be adhered to the display screen.

* * * * *